Figure 1:
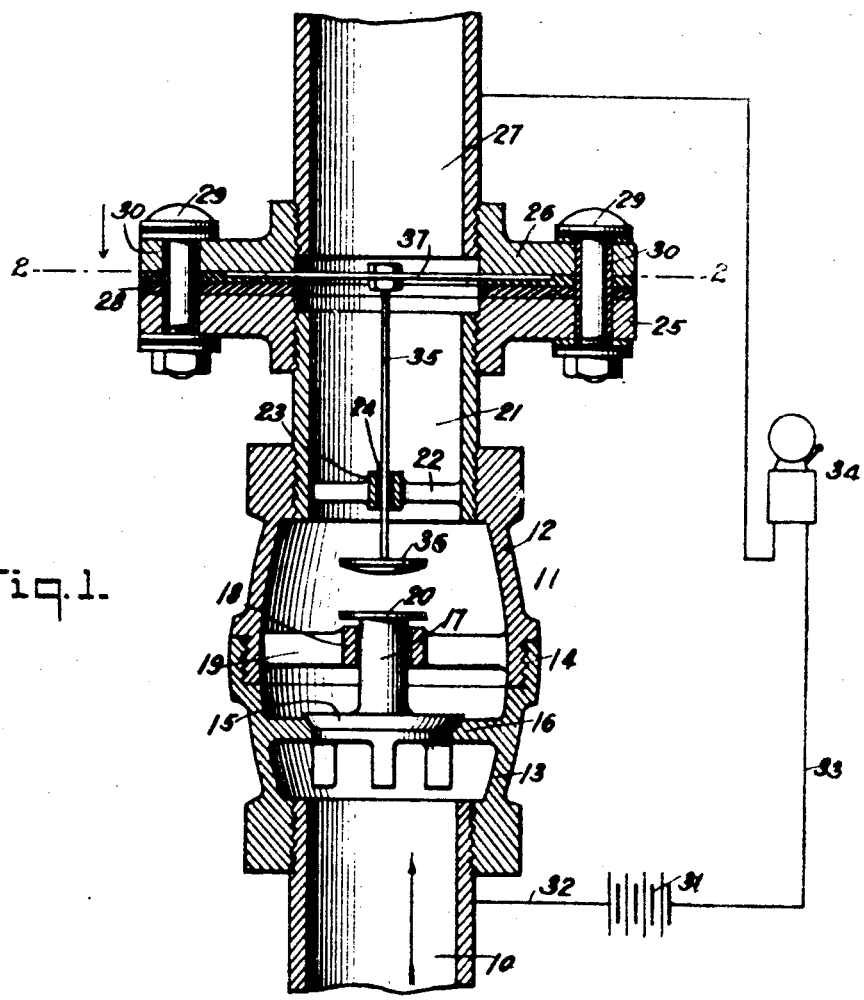

L. LEITMAN.
WATER FLOW ALARM.
APPLICATION FILED MAY 3, 1918.

1,306,154.

Patented June 10, 1919.

WITNESSES

INVENTOR
Louis Leitman
BY
ATTORNEYS

UNITED STATES PATENT OFFICE.

LOUIS LEITMAN, OF MOUNT VERNON, NEW YORK.

WATER-FLOW ALARM.

1,306,154.   Specification of Letters Patent.   Patented June 10, 1919.

Application filed May 3, 1918. Serial No. 232,360.

*To all whom it may concern:*

Be it known that I, LOUIS LEITMAN, a citizen of Russia, and a resident of Mount Vernon, in the county of Westchester and State of New York, have invented a new and Improved Water-Flow Alarm, of which the following is a full, clear, and exact description.

This invention relates to indicators or alarms that are calculated to give notice or warning to any superintendent, owner, or other official, who should be informed of the fact that a flow of water or other fluid is taking place in a pipe line.

More definitely stated the primary object of this invention is to provide certain improvements in or attachments to a stand pipe that is intended to convey water in or through a building equipped with automatic sprinklers, the water being normally static in the stand pipe but obviously adapted to flow when one or more of the automatic sprinkler heads are caused by any means to be set into operation, thereby necessitating or making desirable the fact that the proper officials be informed immediately of the fact that something abnormal is taking place in the building system.

In the automatic sprinkler practice in city buildings it is not infrequent that the sprinkler heads permit the discharge of water either by reason of the fusion of the safety links or struts therein or because of spontaneous collapse thereof due to cold flow of the solder or otherwise, and hence if the flow of water is caused by premature collapse of the sprinkler heads it is essential that the officials be immediately informed of the fact, whether a fire be present or not, so that the damage that might result from the escape of water will be kept down to a minimum.

While I have referred herein to the application or adaptation of this improvement to the vertical stand pipes of automatic sprinkler systems I wish it to be distinctly understood that I do not propose to be limited unnecessarily in this respect to any particular field of applicability of the specific structure constituting my improvement.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 2:
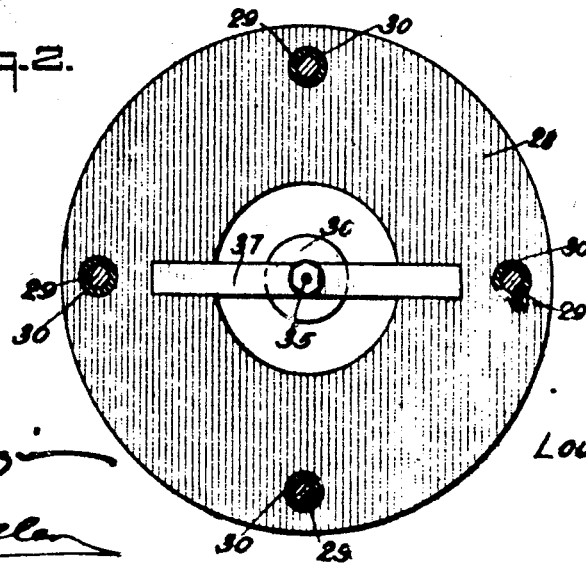

Figure 1 is a vertical sectional view of a portion of a stand pipe showing my improvement therein with the movable parts in normal position, the view indicating also a diagram of the audible alarm system associated with the stand pipe; and Fig. 2 is a horizontal section on the line 2—2 of Fig. 1.

Referring now more particularly to the drawings, I show a pipe 10 which for the purpose of this description may be understood to be a water pipe leading upward from a city main or other available open source of water supply into or through a building guarded from fire by any suitably arranged number of automatic sprinklers.

Located at any convenient place where the pipe 10 is substantially vertical I provide a valve casing 11 comprising upper and lower parts 12 and 13 shown as having threaded connection at 14 about midway between the ends and constituting a housing for a valve 15 seated normally by gravity upon a valve seat 16 formed on or constituting a part of the lower section 13 of the casing. The valve is shown provided with a stem 17 guided for vertical reciprocation through the hub 18 of a spider or frame 19 carried upon the inside of the upper casing section 12. The upper end of the stem 17 is provided with any suitable form of head or disk 20.

The lower section 13 of the casing is adapted to be coupled to the end of the pipe section 10, while the upper end of the section 12 is likewise adapted to be connected to a continuation of the same stand pipe as indicated by the section 21. This section 21 is shown provided with a spider or frame 22 having a central guide hub 23 fitted with a thimble or lining 24 of insulation.

The section 21 of the stand pipe may be relatively short and directly connected to its upper end is the lower half 25 of a coupling whose other half 26 is connected to or constitutes a part of the lower end of a further stand pipe extension 27 leading upward or in any other direction to any suitable outlets or sprinkler heads. While the coupling members 25 and 26 are shown as screw threaded to the respective pipe sections 21 and 27 it will be understood that they may be integral flanges or otherwise connected to the pipe sections. The most essential characteristic, however, of this coupling lies in the use of one or more annular pieces of insulation 28 between the members 25 and 26, the bolts or other analogous fasteners 29 serving to rigidly connect the coupling sections being insulated from the coupling members by sleeves 30 of insulation. It will thus be seen that there is no direct metallic contact between the coupling member 26 of the upper pipe section 27 and any pipe part or coupling below it.

31 indicates a battery or other suitable source of electrical energy, one wire 32 of which leads to the pipe 10 while the other wire 33 leads through an indicator device 34, shown as an audible alarm, to the pipe section 27. Obviously these two points of connection between the wires 32 and 33 and the stand pipe may be variously determined, it being essential only in this respect that they be connected to the stand pipe on opposite sides of the insulated joint so that normally the alarm device is inactive, the circuit being broken at the joint 28.

35 indicates a contact member in the form of a rod projecting through the sleeve of insulation 24 and having a head or end 36 within the valve casing 11 in position to be engaged by the contact head 20 at the upper end of the valve stem when the upward flow of water through the stand pipe acts to unseat the valve in an upward direction. The upper end of the rod 35 is permanently connected at the center to a metallic strip 37 which may be resilient and having its ends anchored between the lower face of the coupling section 26 and the top of the insulation 28. When the valve contact head 20 is caused to strike against the contact head 36 because of the flow of water through the stand pipe the circuit from the battery 31 is completed and the bell is caused to sound, which ringing of the bell will continue until the flow of water is stopped.

I am aware that it is not broadly new with me to provide alarm means to be sounded or indicated at a distance to indicate the flow of water through a stand or other pipe, but so far as I have been advised the previous devices are more or less complicated, necessitating a high initial cost for installation and maintenance and which are more or less unreliable by reason of the complexity thereof. My device being relatively simple in construction is still sure to operate for its desired purpose and will not cause any material obstruction to the necessary or desired flow of water through the stand pipe for sprinkling purposes.

I claim:

1. In a circuit closer for water flow alarms, the combination with a support comprising a plurality of sections connected to each other with insulation between them, of a metallic contact member leading from one support section across the joint of insulation into the other support section, and a movable contact member carried by the latter section normally spaced from the first mentioned contact member.

2. In a device of the character set forth, the combination with two support sections and means including insulation connecting the two sections, of an upper contact member, a plate between the insulation and one section serving to connect the contact member to the just mentioned section and holding the contact member within but spaced from the other support section, a movable contact member within the latter mentioned section and normally spaced from the upper contact member, and means to support the movable contact member providing for the movement thereof into contact with the first mentioned contact member.

3. In a device of the character set forth, the combination of a support comprising three sections, hollow connecting means interposed between two of the sections, guiding devices within said connecting means, an insulated joint between one of said two sections and the third, a cross member between the insulation and the third section, a stationary contact member extending downward from the center of the cross member into proximity to but normally spaced from the movable contact aforesaid, and guide means carried by the intermediate section to support the stationary contact member.

LOUIS LEITMAN.